Figure 1:
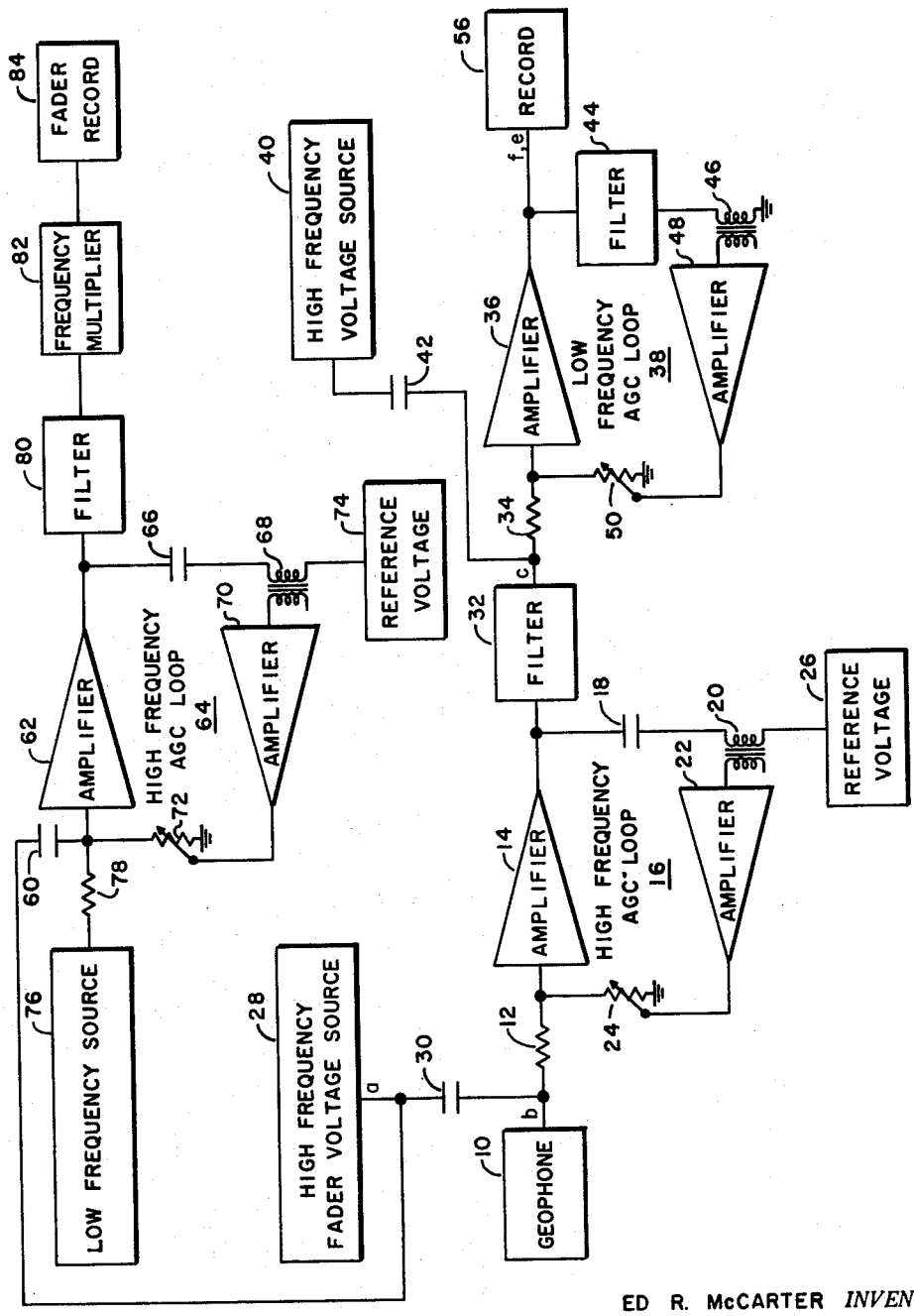

Sept. 1, 1964     E. R. McCARTER     3,147,459
HIGH DYNAMIC RANGE SEISMIC RECORDING SYSTEM
Filed Dec. 26, 1961     4 Sheets-Sheet 1

ED R. McCARTER INVENTOR.
BY John D. Gassett
ATTORNEY

ED R. McCARTER INVENTOR.

BY John D. Gassett
ATTORNEY

United States Patent Office 3,147,459
Patented Sept. 1, 1964

3,147,459
HIGH DYNAMIC RANGE SEISMIC
RECORDING SYSTEM
Ed R. McCarter, Tulsa, Okla., assignor to Jersey Production Research Company, a corporation of Delaware
Filed Dec. 26, 1961, Ser. No. 161,975
6 Claims. (Cl. 340—15.5)

The present invention relates to a system for the recording and reproduction of seismic signals. It relates especially to a large dynamic range recording and reproduction system.

The use of seismic methods of prospecting for subterranean deposits of minerals such as petroleum deposits is widespread. In essence, such methods generally include generating a seismic shock at the earth's surface under such conditions that an elastic impulse or seismic wavelet is transmitted downwardly into the earth. Generally, the impulse or down-traveling wavelet is produced by the detonation of a high explosive charge in a shot hole drilled in the surface of the earth. However, other methods such as weight dropping or air shooting, for example, are also used. When a down-traveling wavelet thus generated encounters strata or other subsurface discontinuities, a portion of the energy in the wavelet is reflected back toward the earth's surface. The reflected wavelet reaching the surface is picked up by one or more seismic transducers, commonly called geophones, at positions and locations spaced from the point where the seismic shock wave was initially generated. A geophone converts the wave motion into electrical energy. Each seismic detector generally receives a number of refracted or reflected wavelets which vary both in magnitude and in arrival time. The variations depend upon the number of discontinuities or strata in the subsurface. Due to the many variations in the earth, the electrical energy generated by the geophone usually forms a complex type signal varying in amplitude and time and sometimes having particularly prominent variations in amplitude at times corresponding to the arrival of reflected waves.

Much useful information concerning the nature and depth of subsurface formations can be obtained by noting the time at which a seismic wavelet is initiated and subsequently measuring the time required for the wavelet to be reflected to the seismic geophone from the subsurface discontinuity. To secure this information a seismograph is used to record the moment in which a seismic wavelet was generated and the time when the reflected wavelet reaches the geophone. Normally, such a seismograph records a signal from each geophone or array of geophones in the form of a separate trace on a seismogram. Recently it has been the general practice to record such traces in a reproducible form, such as on magnetic tape. Each trace thus comprises a record of the variations with time and the input of the geophone associated with the trace.

The seismic signal detected by the geophone varies greatly in magnitude with time. The first reflected events detected are quite strong; however, those wavelets or signals recorded later which are from deeper reflection events, are nearly always greatly diminished in magnitude. Various electronic variable resistor and attenuator means have been advanced to compensate for the decay of the seismic signal with respect to time so that the signal could be recorded on conventional recording systems. While these systems have been quite helpful, they have the disadvantage that it is not possible to reproduce the signal in the original amplitude form as detected by the geophone. Recent interpretation systems require that the seismic signal be recorded in a form in which it can be reproduced in its original amplitude form. Recent measurements of geophone voltages produced during actual seismograph operations indicate for example for one system that the largest and smallest signals encountered during any one seismic shot is in the dynamic range of approximately 140 decibels (db). Thus, in order to preserve the largest and smallest amplitude of that seismic signal, recording instruments or means are required to handle a dynamic range of 140 db or higher. This invention discloses such a system.

The recording system includes a fader section and an automatic gain control (AGC) section. The fader section includes a high frequency voltage source which has a pre-set decay curve which extends over a first db range. The high frequency voltage is at least two, and preferably four or five times, greater than the highest frequency content of interest of the seismic signal. The signal detected from the geophone is fed through the fader section which contains a losser element. The losser element is controlled by the pre-set decay curve or fader voltage of the high frequency voltage source. The output seismic signal (or fader compensated seismic signal) from the fader section is fed through a seismic AGC section which has a losser element which is responsive to only those frequencies contained in the seismic signal. A high frequency common amplitude voltage which has the same frequency as the fader voltage, is also passed through the AGC section. The high frequency signal is recorded with the seismic signal on a single channel of a recording system. The seismic AGC section has a second db range. The recording system has a third db range. Thus the signal recorded has a dynamic range equivalent to the first dynamic range of the fader section plus the second dynamic range of the seismic AGC section plus the third dynamic range of the recording system. As the decay signal is selected and thus known for the fader section, the amplification of each portion of the signal by the fader section is known. Likewise, as the original shape of the high frequency signal recorded on the recording means is known, the exact amplification of each portion of the fader compensated or second stage seismic signal by the seismic AGC section is recorded. Thus there is recorded information which shows how each portion of the signal is amplified. Playback means are disclosed which is particularly adapted to reproduce the original seismic signal from the recorded information.

Figure 2:
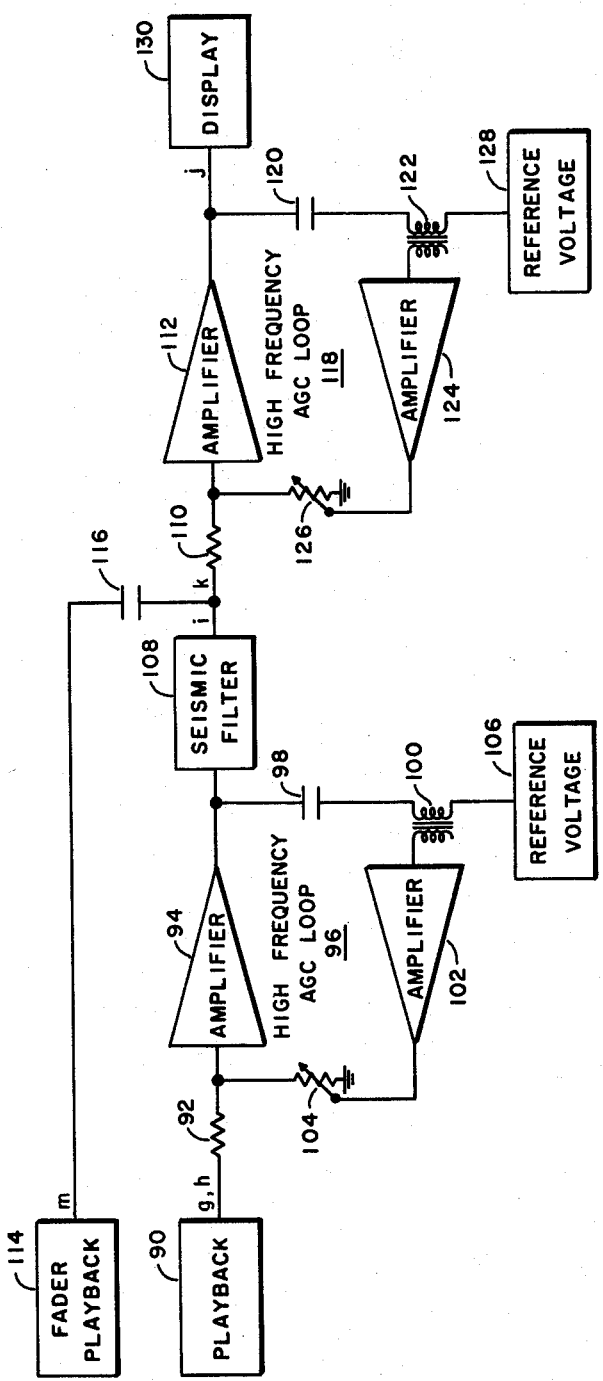
Figure 4:
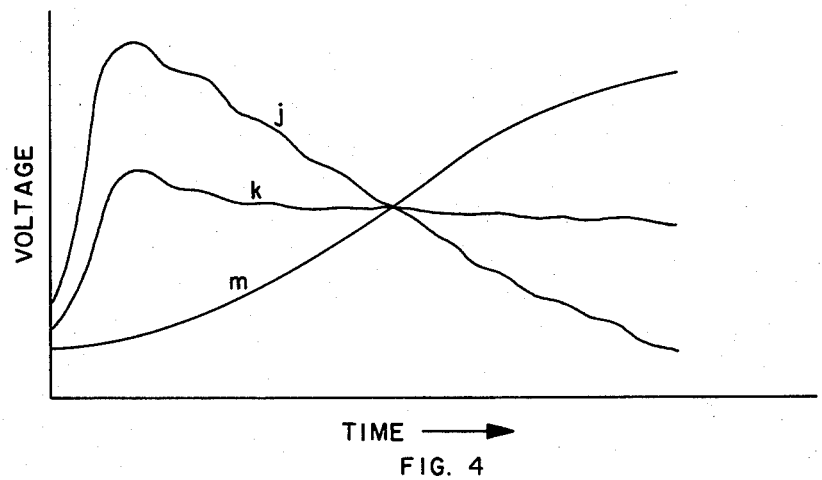

Further objects and a better understanding of the invention may be had from the following description taken in conjunction with the drawing in which:

FIG. 1 illustrates the basic recording system;
FIG. 2 illustrates a playback system for reproducing the signal in FIG. 1;
FIGS. 3, 4, 5 and 6 show curves illustrating the envelope of different signals occurring at different points in the circuits of FIG. 1 and FIG. 2.

Figure 3:
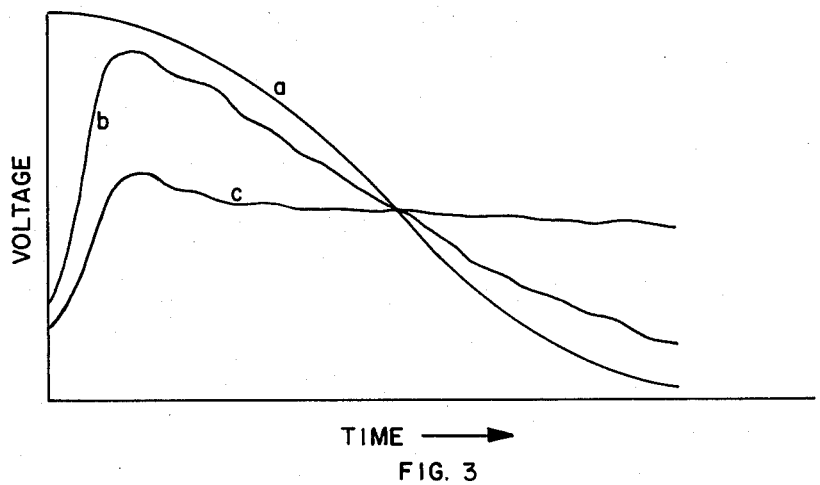

Attention is now directed toward FIG. 1 which illustrates a wide dynamic range recording system. Illustrated thereon is a geophone 10 which is used to detect the reflected seismic signal. The output of geophone 10, which is the original seismic signal, is fed to resistor 12 to amplifier 14 which is part of a high frequency AGC (automatic gain control) loop 16 and which for convenience can be referred to as a fadder section. The geophone output seismic signal was illustrated as curve $b$ in FIG. 3. It will be understood that the seismic signal $b$ is composed of many frequencies and that the curve identified as $b$ in FIG. 3 represents the envelope of that signal. The curves in FIGS. 3, 4, 5 and 6 are envelopes of the signals referred to. The points of occurrence of these signals are also indicated on FIGS. 1 and 2 by their respective reference letters.

High frequency AGC loop 16 includes capacitor 18, transformer 20, amplifiers 14 and 22 and losser element 24. One terminal of the primary winding of transformer 20 is connected to reference voltage source 26. The output of reference voltage source 26 has the same frequency and is in phase with the output signal from fader voltage source 28. The output of amplifier 22 is used to control a variable resistance or losser element 24. The losser element can, for example, be a pair of balanced diodes or balanced vacuum tubes or it can be a photo-resistive element. The control of the amount of input signal fed to amplifier 14, that is the amount of amplification of seismic signal $b$, is accomplished by the feed-back action of the AGC loop by controlling the loss introduced by the losser element 24 in the simple voltage divider circuit made up by resistor 12 and the losser element 24. AGC amplifier loops are known in the geophysical art, one such suitable device being described in U.S. Patent No. 2,726,290 with one such loop being shown in FIG. 4. FIGS. 1, 2 and 3 in that patent illustrate losser elements using vacuum tubes. The AGC amplifier loop in its normal operation functions to maintain essentially a zero voltage differential across the primary winding of transformer 20. The average rectified amplitude of the output of amplifier 14 is then relatively constant.

It is well known in the geophysical art that the first signal received by a geophone is of a much greater magnitude than the signals that come thereafter, in other words the seismic signal decays with time. A high frequency fader voltage source 28 is provided which has an output as illustrated by curve $a$ in FIG. 3. The usual frequency of interest of a seismic signal is from about 20 to about 80 cycles per second. The output frequency of the high frequency fader voltage source 28 should be at least 2 and preferably 4 or 5 times the higest frequency of interest of the seismic signal from geophone 10. The curve $a$ is likewise representative of the envelope of the fader voltage source. The output of high frequency fader voltage source 28 is fed through capacitor 30 through resistor 12 to amplifier 14. High frequency AGC loop 16 is designed to be responsive to the frequencies of the output of fader voltage source 28 but is non-responsive to the frequencies contained in the output of geophone 10. Thus the amount of amplification of the geophone signal 10 is controlled by fader signal $a$ or the output of the fader voltage source 28. It will be noted that at first, fader signal $a$ is quite large, thus the gain of seismic signal through amplifier 14 is low. As time increases, fader signal $a$ decreases and thus the amplification of seismic signal $b$ increases.

The output of amplifier 14 is fed to filter 32. Filter 32 is a low frequency filter which permits the passage of frequencies which are within the range of the seismic signal from geophone 10 but rejects the frequencies of the fader signal. The output of filter 32 then is seen to be represented by the curve $c$ of FIG. 3 and it is the seismic signal which has been acted upon to compensate for part of the decay with respect to time of the signal. It is recognized that the decay curve cannot be completely accurate.

The output of filter 32 (which can for convenience be referred to as a fader-compensated signal) is fed through resistor 34 to amplifier 36 which is part of the low frequency or seismic AGC loop 38. AGC loop 38 is similar to AGC loop 16 except that it is designed such that it is responsive to the frequencies of the seismic signal. This is accomplished mainly by having a filter 44 which rejects the high frequencies but permits the frequency of the seismic signal passed therethrough. AGC loop 38 also includes transformer 46, amplifier 48 and losser element 50. In this case transformer 46 has the terminal of the primary winding grounded. Also connected through resistor 34 to amplifier 36 is a high frequency voltage source 40 which is connected through capacitor 42. The high frequency voltage source 40 has the same frequency as the high frequency fader voltage source 28. The output of high frequency voltage source 40 is of a constant envelope. The amount of amplification of the output of high frequency voltage source 40 is controlled then by the signal $c$ which is the seismic signal whose envelope was controlled in accordance with the fader voltage source $a$. The output of amplifier 36 then contains high frequency and low frequencies. The high frequency envelope is identified as envelope $f$ in FIG. 5. It will be noted that FIGS. 5 and 6 contain 400 cycles per second for $f$ and $h$, however this is only illustrative and not limiting.

Figure 5:
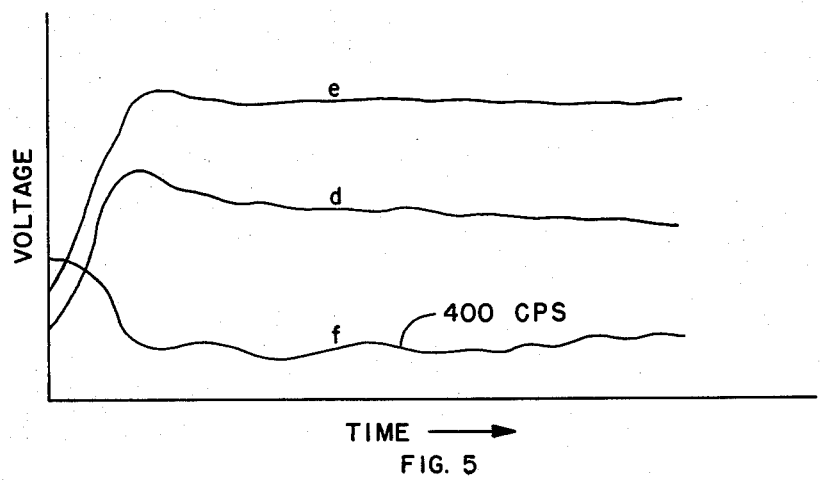

The output from amplifier 36 is then recorded on recording means 56. The record 56 then contains the signals whose envelopes are represented in FIG. 5 by $f$ and $e$. This can be done by simply recording such as is commonly done on a tape recorder. Record 56 contains the seismic signal as it has been operated upon to compensate for the decay with time. The record 56 also contains a high frequency component. The seismic signal which has been recorded on record means 56 has been first controlled by the high frequency fader voltage source 28 to compensate for decay of the signal with respect to time so as to obtain a signal of relatively uniform voltage level as indicated by $c$ in FIG. 3. This signal is also represented by curve $d$ in FIG. 5. This signal is then controlled by itself through its own AGC loop 38 to control the final output of gain which is illustrated in $e$ in FIG. 5. In order to determine the amount of amplification by amplifier 36, the high frequency voltage source 40 has been acted upon or amplified in a same manner as the seismic signal. The amplitude of the high frequency voltage from voltage source 40 is known; also known is the amplitude of this same high frequency voltage after amplification. As the amplitude is known both before and after amplification, then the amplification factor of amplifier 36 is known. Amplifier 36 amplifies both the high frequency signal from source 40 and the seismic signal by the same amplification factor. It follows then that the amplification factor of the seismic signal is known and is the same as the amplification of the high frequency voltage. Attention will now be directed toward that part of FIG. 1 which is useful for recording the inverse of the fader signal from high frequency fader voltage source 28. As will be seen hereinafter, this part is important in the playback on the equipment of FIG. 2 which is used to reproduce the output from geophone 10 from the signals recorded upon record 56. The output from high frequency fader voltage source 28 is fed through capacitor 60 to amplifier 62 which is a part of the high frequency AGC loop 64. Loop 64 is similar to loop 16 and operates under the same general principles. AGC loop 64 also includes capacitor 66, transformer 68, amplifier 70 and a losser element 72. A reference voltage source 74 is connected to one terminal of the primary winding of transformer 68. Reference voltage 74 can be any convenient voltage with the same frequency and phase as 28.

A low frequency source 76 is connected through resistor 78 to amplifier 62. The low frequency source 76 has an output signal whose envelope is a constant level and whose frequency is considerably lower than that of the high frequency fader voltage source 28. The amplification of the low frequency source through amplifier 62 is controlled by fader voltage output from source 28 which is represented by curve $a$ of FIG. 3. The output of amplifier 62 is fed through filter 80 which filters out the high frequency fader voltage source and permits to pass therethrough the low frequency signal whose gain has been controlled by the losser element 72 which in turn was controlled directly by the fader voltage source $a$. Thus the signal that passes through filter 80 is a direct representation of the manner in which the fader voltage source "acts" upon the geophone signal. The output of filter 80 is fed to frequency multiplier 82 so that the output of frequency multiplier 82 is of the same frequency as the frequency of the output of high frequency fader voltage source 28. The output of frequency multiplier 82 is recorded on fader record 84. The envelope of the signal recorded upon fader record 84 is represented by the smooth envelope m of FIG. 4.

To briefly summarize the function of the system in FIG. 1, it is seen that geophone 10 detects a seismic signal. The amount of amplification through amplifier 14 is controlled by a high frequency fader voltage source which is illustrated by curve a in FIG. 3 which is selected to compensate for the decay of the seismic signal with respect to time. Since the pre-set fader voltage will probably not exactly compensate for the decay in the seismic signal, the AGC loop 38 will cause additional compensation thus giving a nearly constant output signal e for recording. Signal d (which is the same as signal c) also controls amplification of the high frequency source which likewise passes through amplifier 36. Thus there is recorded on record means 56 the seismic signal which has been subjected to two amplifications and the record is made on 56 of the second amount of gain for each part of the seismic signal. Simultaneously a record is made on fader record 84 which records an indication of the amount of amplification of the first or fader stage of amplification of the seismic signal.

Figure 6:
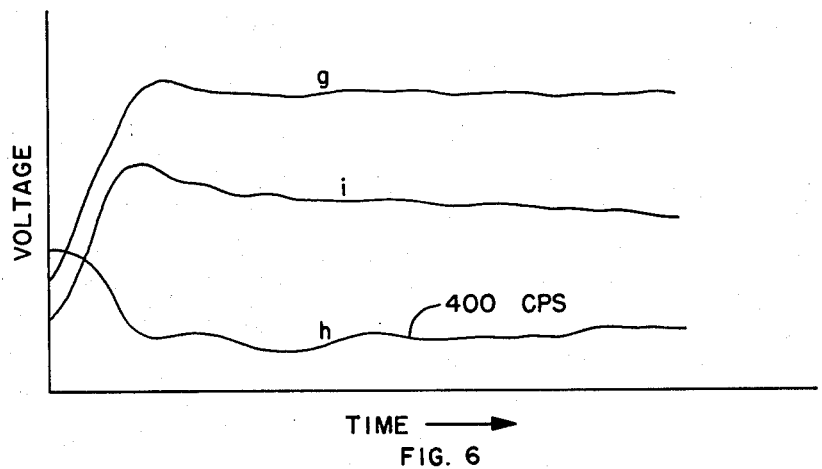

Attention will now be directed to FIG. 2 which illustrates a system for reproducing a seismic signal with the exact magnitude that it was detected by geophone 10. Playback 90 is of a character to reproduce the signal recorded on record means 56. It will be recalled that record means 56 and recorded thereon a high frequency signal and the seismic signal which is of a relatively lower frequency. The output from playback 90 then contains a first signal or seismic signal which has an envelope represented by the curve g in FIG. 6 and a second signal represented by the curve h in FIG. 6. This output from playback 90 is fed through resistor 92 to amplifier 94 which is part of AGC loop 96. AGC loop 96 can be identical to high frequency AGC loop 64 for example. AGC loop 96 also includes capacitor 98, transformer 100, amplifier 102 and losser element 104. A reference voltage 106 which is similar to reference voltage 74 is connected to one terminal of the primary winding of transformer 100. Thus in operation the amount of gain applied to the seismic signal fed to amplifier 94 is controlled by the high frequency signal recorded on record means 56. Referring to FIG. 6 the seismic signal which is fed to amplifier 94 has an envelope g and the output, an envelope i. The output of amplifier 94 is fed through a seismic filter 108 which permits the frequencies of the seismic filter to pass therethrough.

The seismic signal from 108 is fed through a resistor 110 to amplifier 112. Amplifier 112 is part of a high frequency loop 118 which is similar to loop 96. High frequency AGC loop 118 includes capacitor 120, transformer 122, amplifier 124 and losser element 126. A reference voltage 128 similar to reference voltage 106 is connected to a terminal of primary winding of the transformer 122. The high frequency AGC loop 118 is designed to be responsive to the high frequency of the fader signal but non-responsive to the frequencies of the seismic signal. Fader playback 114 is of a character to reproduce the signal recorded on fader record 84. Thus the output signal from fader playback 114 has an envelope represented by the curve m of FIG. 4. This high frequency signal is fed through capacitor 116 and resistor 110 to amplifier 112. As the AGC loop 118 is only responsive to the high frequency, losser element 126 is controlled by the fader playback signal. Thus the seismic signal (a seismic signal fed to amplifier 112) is seen to be the same as the signal from filter 32 as the high frequency AGC loop 96 operated in accordance with the high frequency voltage signal recorded on recorder 56 to remove the effect of the amplifier 36 upon the seismic signal. Likewise, high frequency AGC loop 118 operates to remove the effect of the original fader signal a in order to obtain an output whose signal is represented by the envelope j of FIG. 4 which is the same as the envelope b of FIG. 3. Thus there is reproduced a signal from the output of amplifier 112 which is essentially identical in amplitude and frequency as the signal which was originally detected in the field and recovered as the output signal from geophone 10. This signal is fed to display 130 which can be punch cards or the like for use on high speed computers.

In recording the largest and smallest signals encountered on any one seismic "shot," it has been found that it is required to have recording instruments that can handle a dynamic range of 140 db so that both the largest and smallest signals will be recorded. The system just described above will record such large range and at a later time reproduce the signal in its original amplitude form as shown above. These embodiments will handle a dynamic range of 140 db (decibels) or higher. The pre-set decay curve of the fader signal (envelope a) in one embodiment is set to extend over a 50 db range which is a practical limit of the tape recorder. Amplifier 36 and its loop 38 is set to have a dynamic range extending over 40 db. The amplifying means associated with recorder 56 is set a 50 db which is presently a practical limit on the tape. This makes a 140 db dynamic range recording system. By the use of the embodiment described above, the amplifier and tape recording combination will record this large range of 140 db and at a later time reproduce the signal in its original amplitude form. This wide range permits a more complete analysis of the signal which is recorded because the largest and smallest signal encountered on any one shot (or other seismic disturbance) are recorded and reproduced in their relative original amplitude form.

It will be understood that the apparatus and system contained in the above description are merely representative or illustrative and are not limited and that numerous modifications may be made thereon without departing from the scope of the invention.

What is claimed is:

1. A system for recording a seismic signal detected by a geophone which comprises in combination: a high frequency fader voltage source, whose output has a frequency at least twice the frequency of the seismic signal; a high frequency AGC loop having a losser element which is responsive to a frequency corresponding to the output of said high frequency fader voltage source; means to connect the output of said high frequency fader voltage source and the output from the geophone to said high frequency AGC loop; a filter connected to the output of said high frequency AGC loop and of a character to pass therethrough those frequencies contained by the seismic signal and reject the frequency of the output of the high frequency fader voltage source; a second high frequency voltage source, the output of said second high frequency voltage source being of the same frequency as the output of said high frequency fader voltage source; a low frequency AGC loop having a losser element responsive to frequencies within the range of the seismic signal; means to connect the output of said filter and said second high frequency voltage source to said low frequency AGC loop; and means to record the output of said low frequency AGC loop.

2. A recording system for recording the inverse of the output of a high frequency fader voltage source which comprises in combination: a low frequency voltage source whose output frequency is constant and is much less than the frequency of the high frequency of the fader voltage source; a high frequency AGC loop containing a losser element responsive to the frequency of the output of the high frequency fader voltage source; means to connect the output of said high frequency fader voltage source and the output of said low frequency source to said high frequency AGC loop; a filter electrically connected to the output of said high frequency AGC loop and of a character to pass therethrough the frequency of said low frequency source and reject the frequencies of the high frequency fader voltage source; a frequency multiplier electrically connected to the output of said filter and of a character to multiply the frequency of the output of said filter by a factor to obtain the frequency of the output of the high frequency fader voltage source; and means to record the output of said frequency multiplier.

3. A system for reproducing a seismic signal as detected by a geophone in which on a first recording medium the processed seismic signal is recorded and also thereon is a high frequency signal which is a record of one stage of the amplification of the processed seismic signal and on a second recording medium is recorded the inverse of the high frequency fader signal, which comprises: a first playback for reproducing the processed seismic signal and the high frequency signal; a high frequency AGC loop having a losser element responsive to the high frequency signal; a seismic filter connected to the output of said high frequency AGC loop to pass therethrough the frequencies of the seismic signal but reject those of the high frequencies; a fader playback means for reproducing the inverse fader signal; a second high frequency AGC loop having a losser element responsive to high frequencies; means to connect the output of said filter and said fader playback to said second high frequency AGC loop; and display means connected to the output of said second high frequency AGC loop.

4. A recording system for recording a seismic signal from a geophone and which decays with respect to time which comprises in combination: a high frequency fader voltage source whose output is designed to compensate for the decay of the seismic signal; a fader section electrically connected to the output of said geophone and to said high frequency fader voltage source, said fader section amplifying the seismic signal in accordance with the output of the fader voltage source so as to obtain a fader compensated seismic signal; a high frequency voltage source having an output of the same frequency as said fader voltage source output; a seismic AGC section electrically connected to the output of said fader section and also connected to said high frequency voltage source whose gain is controlled by the fader compensated seismic signal; and means to record the output of said seismic automatic gain control loop.

5. A recording system for recording a seismic signal from a geophone and which signal decays with respect to time which comprises in combination: a high frequency fader voltage source whose output is designed to compensate for the decay of the seismic signal; a fader section means electrically connected to the output of said geophone and to said high frequency fader voltage source, said fader section being of a character to operate upon the seismic signal in accordance with the output of the fader voltage source so as to obtain a fader compensated seismic signal; a second high frequency voltage source having an output of the same frequency as said fader voltage source output; a seismic AGC section electrically connected to the output of said fader section and also connected to said second high frequency voltage source and whose gain is controlled by the fader compensated seismic signal; first recording means to record the output of said seismic AGC loop; a low frequency voltage source whose output frequency is constant and is much less than the frequency of the output of the fader voltage source; a high frequency AGC loop containing a losser element responsive to the frequency of the output of the high frequency fader voltage source; means to connect the output of said high frequency fader voltage source and the output of said low frequency source to said high frequency AGC loop; a filter electrically connected to the output of said high frequency AGC loop to pass therethrough the frequency of said low frequency source and reject the frequency of the high frequency fader voltage source; a frequency multiplier electrically connected to the output of said filter to multiply the frequency of the output of said filter by a factor to obtain the frequency of the output of the high frequency fader voltage source; and second recording means to record the output of said frequency multiplier.

6. A system for recording a seismic signal detected by a geophone which comprises in combination: a high frequency fader voltage source whose output is selected to compensate for the decay of the seismic signal and whose frequency is at least twice the highest frequency contained in the seismic signal; a first high frequency AGC loop having a losser element which is responsive to a frequency corresponding to the frequency of the output of said high frequency fader voltage source; means to connect the output of said high frequency fader voltage source and the seismic signal from the geophone to said first high frequency AGC loop; a filter connected to the output of said first high frequency AGC loop and of a character to pass therethrough those frequencies contained in the seismic signal and reject the frequency of the output of the high frequency fader voltage source; a second high frequency voltage source, said output being of the same frequency as the output of said high frequency fader voltage source; a low frequency AGC loop having a losser element responsive to frequencies within the range of the seismic signal; means to connect the output of said filter and said second high frequency voltage source to said low frequency AGC loop; a low frequency voltage source whose output frequency is constant and is much less than the frequency of the high frequency of the fader voltage source; a second high frequency AGC loop containing a losser element responsive to the frequency of the output of the high frequency fader voltage source; means to connect the output of said high frequency fader voltage source and the output of said low frequency source to said second high frequency AGC loop; a second filter electrically connected to the output of said second high frequency AGC loop and of a character to pass therethrough the frequencies of the said low frequency source and reject the frequencies of the high frequency fader voltage source; a frequency multiplier electrically connected to the output of said second filter and of a character to multiply the frequency of the output of said second filter by a factor to obtain the frequency of the output of the high frequency fader voltage source; first recording means to record the output of said frequency AGC loop and second recording means to record the output of said frequency multiplier.

References Cited in the file of this patent

UNITED STATES PATENTS

| | | |
|---|---|---|
| 2,838,742 | McManis | June 10, 1958 |
| 3,048,817 | Greening | Aug. 7, 1962 |